(12) United States Patent
Ruscio et al.

(10) Patent No.: US 7,661,016 B2
(45) Date of Patent: Feb. 9, 2010

(54) METHOD FOR A CHECKPOINT LIBRARY TO DETECT CORRUPTION BY AN APPLICATION

(75) Inventors: Joseph F. Ruscio, Blacksburg, VA (US); Michael Heffner, Blacksburg, VA (US)

(73) Assignee: Librato, Inc., Santa Clara, CA (US)

( * ) Notice: Subject to any disclaimer, the term of this patent is extended or adjusted under 35 U.S.C. 154(b) by 421 days.

(21) Appl. No.: 11/562,587

(22) Filed: Nov. 22, 2006

(65) Prior Publication Data

US 2007/0220355 A1 Sep. 20, 2007

Related U.S. Application Data

(60) Provisional application No. 60/775,968, filed on Feb. 23, 2006.

(51) Int. Cl.
*G06F 11/00* (2006.01)
(52) U.S. Cl. .............................. 714/5; 714/42
(58) Field of Classification Search ................. 714/5, 714/42; 711/152
See application file for complete search history.

(56) References Cited

U.S. PATENT DOCUMENTS

| 6,240,531 | B1 * | 5/2001 | Spilo et al. ..................... 714/38 |
| 7,243,196 | B2 * | 7/2007 | Uratani et al. ............... 711/161 |
| 7,380,245 | B1 * | 5/2008 | Lovette ....................... 718/100 |
| 7,506,213 | B1 * | 3/2009 | Cabrera et al. ................ 714/42 |
| 2004/0064718 | A1 * | 4/2004 | Harrington et al. .......... 713/200 |
| 2006/0085679 | A1 * | 4/2006 | Neary et al. .................. 714/13 |
| 2007/0055837 | A1 * | 3/2007 | Rajagopal et al. ........... 711/163 |
| 2007/0277056 | A1 * | 11/2007 | Varadarajan et al. .......... 714/15 |

* cited by examiner

*Primary Examiner*—Marc Duncan
(74) *Attorney, Agent, or Firm*—Arent Fox LLP

(57) ABSTRACT

A method of identifying the source of a memory corruption error during operation of a checkpoint library includes receiving an error detection request and, in response to the request, write protecting all memory regions allocated to a checkpoint library. The method further includes detecting when a memory region is accessed for modification during operation of the checkpoint library and, in response to the detection, identifying the source of a memory corruption error affecting the memory region.

16 Claims, 2 Drawing Sheets

METHOD FOR A CHECKPOINT LIBRARY TO DETECT CORRUPTION BY AN APPLICATION

CROSS REFERENCE TO RELATED APPLICATIONS

This application is related to and claims the benefit of the filing date of U.S. provisional application Ser. No. 60/775,968, filed on Feb. 23, 2006, entitled "A Method for Checkpoint Library to Detect Corruption by an Application," which is hereby incorporated by reference.

BACKGROUND

1. Field

The present disclosure relates generally to distributed processing systems, and more particularly, to systems and techniques for recovering from system failures.

2. Background

Computers and other modern processing systems have revolutionized the electronics industry by enabling complex tasks to be performed with just a few strokes of a keypad. These processing systems have evolved from simple self-contained computing devices, such as the calculator, to highly sophisticated distributed processing systems. Today, almost every aspect of our daily lives involves, in some way, distributed processing systems. In its simplest form, a distributed processing system may be thought of an individual desktop computer capable of supporting two or more simultaneous processes, or a single process with multiple threads. On a larger scale, a distributed processing system may comprise a network with a mainframe that allows hundreds, or even thousands, of individual desktop computers to share software applications. Distributed processing systems are also being used today to replace traditional supercomputers, with any number of computers, servers, processors or other components being connected together to perform specialized applications that require immense amounts of computations. The Internet is another example of a distributed processing system with a host of Internet servers providing the World Wide Web.

As we become more dependent upon distributed processing systems in our daily lives, it becomes increasingly important to guard against system failures. A system failure can be at the very least annoying, but in other circumstances could lead to catastrophic results. For the individual desktop computer, a system failure can result in the loss of work product and the inconvenience of having to reboot the computer. In larger systems, system failures can be devastating to the business operations of a company or the personal affairs of a consumer.

A number of system recovery techniques are employed today to minimize the impact of system failures. One such technique involves "checkpointing" and "rollback recovery." During normal operation, each of a computer's processes saves a snapshot of its states, called a "checkpoint," to stable storage. When a failure occurs, a rollback recovery program may retrieve a set of saved checkpoints. The failed process can then roll back to the corresponding retrieved checkpoint and resume execution from there. A checkpoint library comprising a collection of precompiled routines may be implemented in a distributed processing system to support checkpoint and rollback recovery programs. Checkpoint libraries may be particularly useful for storing frequently used routines because they do not need to be explicitly linked to every program that uses them. Instead, a linker automatically looks in libraries for routines that it does not find elsewhere.

Checkpoint libraries are typically linked at runtime with the applications they monitor. During the course of monitoring an application, and compiling meta-data necessary for taking the next checkpoint, a checkpoint library will need to dynamically allocate memory to store the meta-data. In a traditional system, the process address space shared by the application, the checkpoint library and all other libraries loaded at runtime will share a single heap, which is the source of dynamically allocated memory. Unfortunately, applications and libraries sometimes contain software errors that affect the handling of dynamically allocated memory. For example, in a common error known as an "overflow," an application allocates a section of memory space and attempts to modify it but, due to a math error in the application's code, modifies an address outside of the allocated memory space. Since all dynamic memory is allocated from the same heap, the inadvertently modified memory address may already be in use by the application or another library. If so, this unexpected modification can alter execution of the application or other library, causing serious problems to system operation.

Typical debugging processes may not flush out such programming errors. For example, if an overflow error within a system library causes modification of unused memory blocks or blocks that an application is no longer using, the system library and application may operate without being affected by the error. However, when a checkpoint library is added to the system, the error may cause trouble if routines within the checkpoint library happen to use the memory blocks that are modified by the overflow error in the system library. The checkpoint library memory allocations, when interleaved with system library memory allocations, create a new allocation pattern that may result in the previously harmless error becoming memory corruptions that render the checkpoint library unusable. A user of the system may attribute the trouble to the checkpoint library, even though the error is in the system library, because the error did not surface until the checkpoint library was added to the system. People may stop using the checkpoint library because they mistakenly perceive it to be the root of the new troubles. Checkpoint library providers may be looked poorly upon, even though their libraries contain no errors and would work perfectly if the system library did not have errors. Ultimately, checkpoint library developers may gain a poor reputation and be unable to effectively promote their products.

SUMMARY

In one aspect of the present invention, a storage medium containing a set of program instructions executable by a processor within a system includes a routine to receive an error detection request, and a routine to write protect all memory regions allocated to a checkpoint library in response to the request, detect when a memory region is accessed for modification during operation of the checkpoint library, and identify the source of a memory corruption error affecting the memory region.

In another aspect of the present invention, a computer system includes a memory component and a processor operatively connected to the memory component. The processor is configured to receive an error detection request and, in response to the request, write protect all memory regions in the memory component allocated to a checkpoint library, detect when a memory region is accessed for modification during operation of the checkpoint library and identify the source of a memory corruption error affecting the memory region.

In yet another aspect of the present invention, a method of identifying the source of a memory corruption error includes receiving an error detection request, write protecting all memory regions allocated to a checkpoint library in response to the request, detecting when a memory region is accessed for modification during operation of the checkpoint library, and identifying the source of a memory corruption error affecting the memory region in response to the detection.

In a further aspect of the present invention, a processor includes means for receiving an error detection request, means for write protecting all memory regions allocated to a checkpoint library in response to the request, means for detecting when a memory region is accessed for modification during operation of the checkpoint library, and means for identifying the source of a memory corruption error affecting the memory region in response to the detection.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
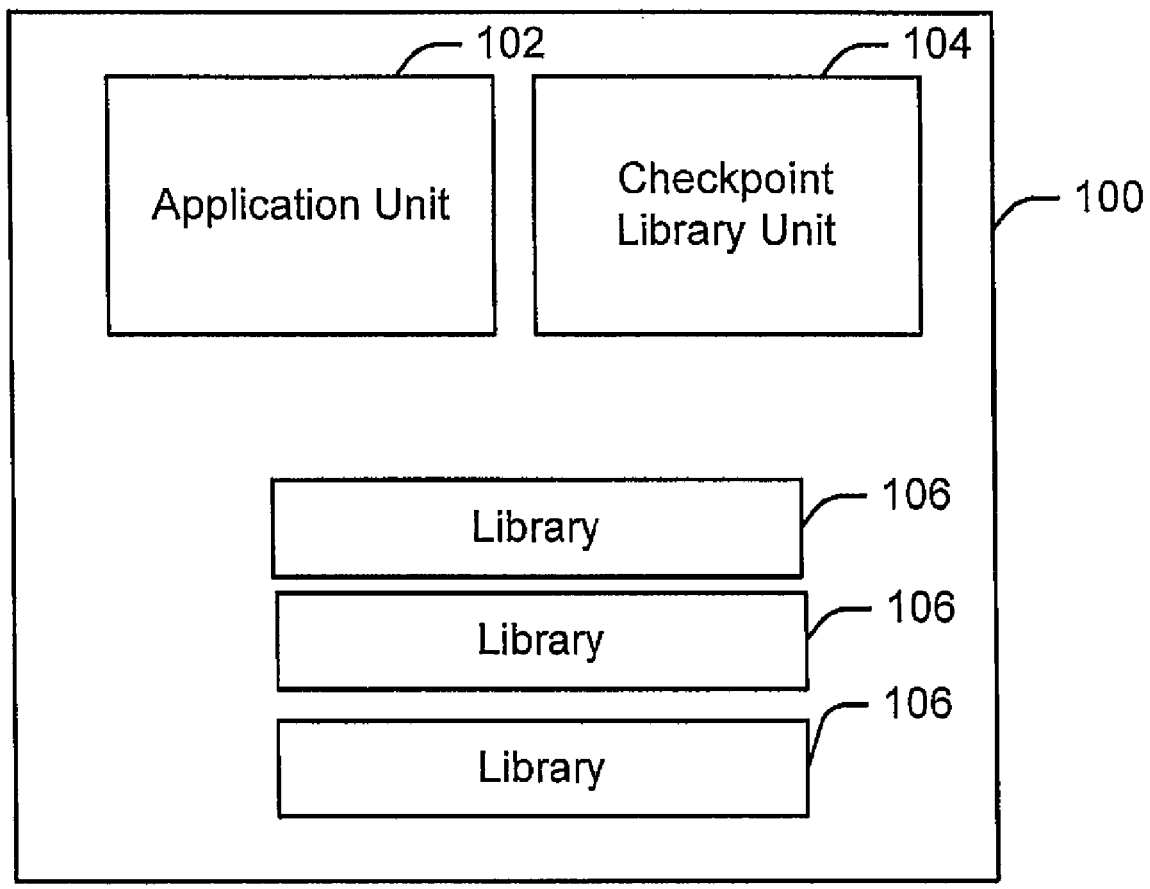
FIG. 1 illustrates an example of application components that share and divide memory resources in a computing system.

FIG. 1 illustrates an example of software application components that may share and divide memory resources in a computing system 100. An application unit 102 and checkpoint library unit 104, in addition to other library components 106, may all require access and operation of system memory to perform their functions. To reduce the occurrence of memory allocation errors like those described above, a checkpoint library may create and operate its own separate heap. By doing so, a checkpoint library may avoid, to some degree, interleaving its allocations with any other allocations in the process running on the system. In the event that another library or other application does attempt to write to pages in the checkpoint library heap, the attempted access may be detected by the checkpoint library when it is operating in a corruption detection mode.

Figure 2:
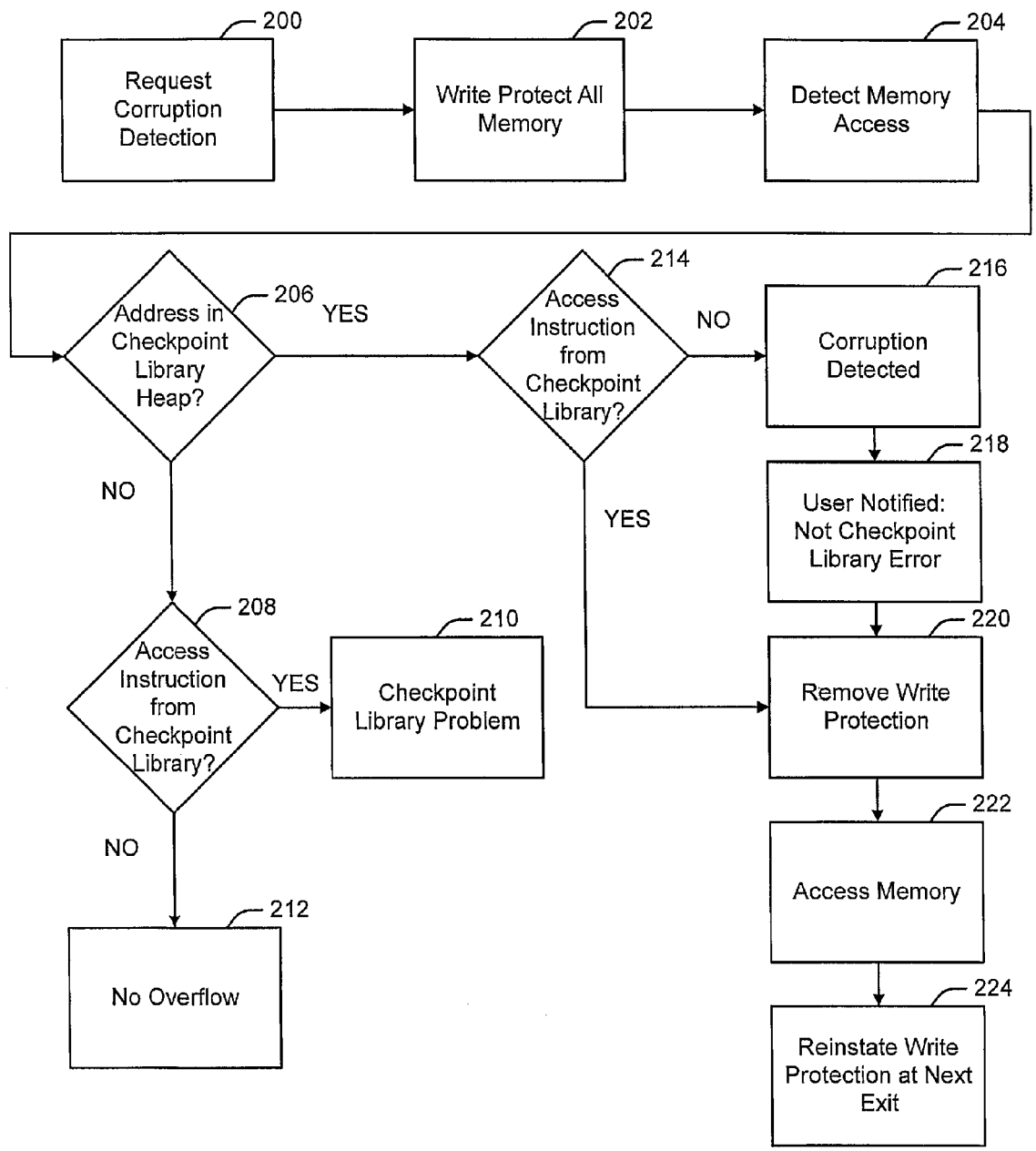
FIG. 2 is a conceptual block diagram illustrating an example of the functionality of a processor configured to detect error-induced memory corruption while performing a checkpoint procedure.

FIG. 2 is a conceptual block diagram illustrating an example of the functionality of a processor configured to detect error-induced memory corruption. At block 200, the checkpoint library may receive a request to operate in a corruption detection mode. The request may be issued by a user, or automatically by the system, when memory corruption errors occur during operation of the checkpoint library. Those skilled in the art will recognize that different mechanisms are appropriate for enabling the corruption detection mode. For example, environment variables or configuration files may be employed statically at checkpoint library startup. Alternatively, the corruption detection mode may be enabled dynamically during execution by an asynchronous notification process comprising sockets, signals or the like. In any event, once the checkpoint library receives the request to operate in a corruption detection mode at block 200, it will alter its normal checkpoint memory-tracking procedures as described below with further reference to FIG. 2.

At block 202, when the checkpoint library is operating in corruption detection mode, it may write protect all heaps having memory allocated to the checkpoint library, including any memory that is never intended to be checkpointed. This ensures that the checkpoint library will receive notification any time a process attempts to modify memory. Upon such notification, the checkpoint library can determine whether the modification is legitimate or the result of an error. At block 204, the checkpoint library may receive such a notification, thereby detecting memory access by some component in the application. The access may have been attempted by an application or system library or, alternatively, by the checkpoint library itself. Because it is operating in corruption detection mode, the checkpoint library may take steps to detect which application component attempted the access.

At block 206, the address of the memory for which access notification was received at block 204 may be compared to addresses contained in the checkpoint library heap. If the address is not included in the checkpoint library heap, the checkpoint library may check the location of its own code, comparing it to the location of the access instruction. This comparison may allow the checkpoint library to determine if it generated the access instruction, as indicated at decision block 208. If it did, then as indicated at block 210 there may be a problem with the checkpoint library because it may have generated an instruction to access memory in an application heap. If not, however, then as indicated at block 212 there may be no interleaving problem and no overflow error affecting that particular page.

On the other hand, if at decision block 206 it is determined that the address is within the checkpoint library heap, it may be the result of an error and, therefore, may be the cause of the memory corruption that the checkpoint library is attempting to detect. At decision block 214, the checkpoint library may check the location of its own code, comparing it to the location of the access instruction, to determine if the checkpoint library itself generated the access instruction. If not, the checkpoint library may conclude that it did not cause the attempted access to that address, so the access must have been directed from a different library or the application. Thus, a corruption is detected at block 216 and the user is notified at block 218 that the checkpoint library is not the source of the memory corruption. On the other hand, it may be the checkpoint library that generated the access. In either case, at block 220 the checkpoint library may remove write protection from the address so that the access can succeed at block 222. Then, because the checkpoint library is still in corruption detection mode, at the next checkpoint library exit point it may reinstate write protection for that address, at block 224. As an alternative to operating with write protection at all times, which may slow system performance significantly, write protection may be turned off at every checkpoint library entry, then turned on again at each checkpoint library exit. Then, there would be no notification or processing slowdown during execution of known checkpoint library routines.

Even when disabling write protection during checkpoint library routines, the corruption detection procedures described above may slow system performance because of the time required to write protect all heaps and handle the resultant access notifications. In other words, in normal operation a checkpoint library may write protect only memory that is intended to be checkpointed, and may re-write protect that memory only after a new checkpoint, while a checkpoint library in corruption detection mode may write protect all memory irrespective of whether it is intended to be checkpointed, and may re-write protect any memory that is modified immediately after the modification. A checkpoint library operating in corruption detection mode, then, may consume a lot of time.

Because the process of recording the accessed memory for future checkpointing consumes time, the checkpoint library may operate a first heap for checkpoint meta-data that must be recorded at the next checkpoint, and a second heap for allocations that can be discarded after the next checkpoint. In other words, the first heap may be used by the checkpoint library exclusively for persistent allocations, which include memory contents that are important beyond the history of a single checkpoint and therefore necessary to restore state of a checkpoint library. The second heap may be used exclusively for temporary allocations, which include memory contents that have no meaning after a checkpoint is taken.

With two separate heaps for the checkpoint library, corruption detection can be performed in the different ways described above. Write protection may be applied to both heaps, such that errors affecting either heap may be detected as described above. Alternatively, to improve system speed during the corruption detection process, write protection may be turned off (for both heaps) at each checkpoint library entry, and turned on again at each checkpoint library exit.

The various techniques described throughout this disclosure may be applied to the constituent components of a distributed processing system to recover from a system failure The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A computer readable storage medium containing a set of program instructions executable by a processor within a system, comprising:
   a routine to receive an error detection request;
   a routine to write protect all memory regions allocated to a checkpoint library in response to the request, detect when a memory region is accessed for modification during operation of the checkpoint library, and identify the source of a memory corruption error affecting the memory region; and
   a routine to notify a user of the checkpoint library about the identified source of the memory corruption error.

2. The computer readable storage medium of claim 1 wherein the routine to identify the source of the memory corruption error further comprises a routine to determine that the accessed memory region is allocated to the checkpoint library.

3. A computer readable storage medium containing a set of program instructions executable by a processor within a system, comprising:
   a routine to receive an error detection request; and
   a routine to write protect all memory regions allocated to a checkpoint library in response to the request, detect when a memory region is accessed for modification during operation of the checkpoint library, and identify the source of a memory corruption error affecting the memory region,
   wherein the routine to identify the source of the memory corruption error further comprises a routine to determine that the accessed memory region is allocated to the checkpoint library, and
   wherein the routine to identify the source of the memory corruption error further comprises a routine to identify the address of an instruction that caused the accessed memory region to be accessed and, based on the address, determine that the instruction is not included in the checkpoint library.

4. The computer readable storage medium of claim 3, further comprising a routine to notify a user of the checkpoint library that the memory corruption error was not caused by the checkpoint library.

5. A computer readable storage medium containing a set of program instructions executable by a processor within a system, comprising:
   a routine to receive an error detection request; and
   a routine to write protect all memory regions allocated to a checkpoint library in response to the request, detect when a memory region is accessed for modification during operation of the checkpoint library, and identify the source of a memory corruption error affecting the memory region,
   wherein the routine to identify the source of the memory corruption error further comprises a routine to determine that the accessed memory region is allocated to the checkpoint library, and
   wherein the routine to identify the source of the memory corruption error further comprises a routine to identify the address of an instruction that caused the accessed memory region to be accessed and, based on the address, determine that the instruction is included in the checkpoint library.

6. The computer readable storage medium of claim 5, further comprising a routine to remove write protection from the accessed memory region, allow the accessed memory region to be modified, and reinstate write protection to the accessed memory region.

7. A computer system, comprising:
a memory component; and
a processor operatively connected to the memory component and configured to receive an error detection request and, in response to the request, write protect all memory regions in the memory component allocated to a checkpoint library, detect when a memory region is accessed for modification during operation of the checkpoint library and identify the source of a memory corruption error affecting the memory region,
wherein the processor is further configured to notify a user of the checkpoint library about the identified source of the memory corruption error.

8. The computer system of claim 7 wherein the processor is further configured to determine that the accessed memory region is allocated to the checkpoint library.

9. A computer system, comprising:
a memory component; and
a processor operatively connected to the memory component and configured to receive an error detection request and, in response to the request, write protect all memory regions in the memory component allocated to a checkpoint library, detect when a memory region is accessed for modification during operation of the checkpoint library and identify the source of a memory corruption error affecting the memory region,
wherein the processor is further configured to determine that the accessed memory region is allocated to the checkpoint library,
wherein the processor is further configured to identify the address of an instruction that caused the accessed memory region to be accessed and, based on the address, determine that the instruction is not included in the checkpoint library.

10. The computer system of claim 9 wherein the processor is further configured to notify a user of the checkpoint library that the memory corruption error was not caused by the checkpoint library.

11. A computer system, comprising:
a memory component; and
a processor operatively connected to the memory component and configured to receive an error detection request and, in response to the request, write protect all memory regions in the memory component allocated to a checkpoint library, detect when a memory region is accessed for modification during operation of the checkpoint library and identify the source of a memory corruption error affecting the memory region,
wherein the processor is further configured to determine that the accessed memory region is allocated to the checkpoint library,
wherein the processor is further configured to identify the address of an instruction that caused the accessed memory region to be accessed and, based on the address, determine that the instruction is included in the checkpoint library.

12. The computer system of claim 11 wherein the processor is further configured to remove write protection from the accessed memory region, allow the accessed memory region to be modified, and reinstate write protection to the accessed memory region.

13. A method of identifying the source of a memory corruption error, comprising:
receiving an error detection request;
write protecting all memory regions allocated to a checkpoint library in response to the request;
detecting when a memory region is accessed for modification during operation of the checkpoint library; and
identifying the source of a memory corruption error affecting the memory region in response to the detection,
wherein identifying the source of the memory corruption error includes determining that the accessed memory region is allocated to the checkpoint library,
wherein identifying the source of the memory corruption error includes identifying the address of an instruction that caused the accessed memory region to be accessed and, based on the address, determining that the instruction is not included in the checkpoint library.

14. The method of claim 13 further comprising a notifying a user of the checkpoint library that the memory corruption error was not caused by the checkpoint library.

15. A computer system, comprising:
means for receiving an error detection request;
means for write protecting all memory regions allocated to a checkpoint library in response to the request;
means for detecting when a memory region is accessed for modification during operation of the checkpoint library; and
means for identifying the source of a memory corruption error affecting the memory region in response to the detection,
wherein the means for identifying the source of the memory corruption error is configured to determine that the accessed memory region is allocated to the checkpoint library, and
wherein the means for identifying the source of the memory corruption error is configured to identify the address of an instruction that caused the accessed memory region to be accessed and, based on the address, to determine that the instruction is not included in the checkpoint library.

16. A computer system, comprising:
means for receiving an error detection request;
means for write protecting all memory regions allocated to a checkpoint library in response to the request;
means for detecting when a memory region is accessed for modification during operation of the checkpoint library;
means for identifying the source of a memory corruption error affecting the memory region in response to the detection, and
means for notifying a user of the checkpoint library about the identified source of the memory corruption error.

* * * * *